United States Patent
Gutzer et al.

(10) Patent No.: US 11,480,099 B2
(45) Date of Patent: Oct. 25, 2022

(54) INTERNAL COMBUSTION ENGINE LUBRICATED WITH A WATER-CONTAINING LUBRICANT

(71) Applicant: Bayerische Motoren Werke Aktiengesellschaft, Munich (DE)

(72) Inventors: Ulrich Gutzer, Munich (DE); Martin Koerber, Neufahrn (DE); Georg Johann Meingassner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/312,138

(22) PCT Filed: Nov. 21, 2019

(86) PCT No.: PCT/EP2019/082040
§ 371 (c)(1),
(2) Date: Jun. 9, 2021

(87) PCT Pub. No.: WO2020/120094
PCT Pub. Date: Jun. 18, 2020

(65) Prior Publication Data
US 2022/0042449 A1    Feb. 10, 2022

(30) Foreign Application Priority Data
Dec. 11, 2018  (DE) .................. 10 2018 131 689.5

(51) Int. Cl.
*F02B 47/02* (2006.01)
*F01M 9/02* (2006.01)
(Continued)

(52) U.S. Cl.
CPC .............. *F02B 47/02* (2013.01); *F01M 9/02* (2013.01); *F01M 13/0011* (2013.01); *F02M 25/025* (2013.01); *F01M 2013/0016* (2013.01)

(58) Field of Classification Search
CPC ....... F02B 47/02; F01M 9/02; F01M 13/0011; F01M 2013/0016; F02M 25/025; F02M 25/06; Y02T 10/12
See application file for complete search history.

(56) References Cited

U.S. PATENT DOCUMENTS 7,255,067 B1 *  8/2007  Thorpe ................ F01P 9/02
                                         123/41.35
2010/0077987 A1 *  4/2010  Voisin ................ F02B 75/20
                                         60/299

(Continued)

FOREIGN PATENT DOCUMENTS

CN    103122781 A    5/2013
CN    103422933 A    12/2013
(Continued)

OTHER PUBLICATIONS

PCT/EP2019/082040, International Search Report dated Mar. 12, 2020 (Two (2) pages).

(Continued)

*Primary Examiner* — Hung Q Nguyen
(74) *Attorney, Agent, or Firm* — Crowell & Moring LLP

(57) ABSTRACT

An internal combustion engine includes an internal combustion engine interior and a lubricant disposed in the internal combustion engine interior. The lubricant lubricates a component disposed in the internal combustion engine interior and the lubricant is a water-containing lubricant. In an embodiment, the internal combustion engine interior is fluidically connected to an environment surrounding the internal combustion engine by a ventilation device where the ventilation device has a semipermeable membrane which is impermeable to water and water vapor.

7 Claims, 1 Drawing Sheet

(51) Int. Cl.
    *F01M 13/00*     (2006.01)
    *F02M 25/025*     (2006.01)

(56) References Cited

U.S. PATENT DOCUMENTS

| | | | |
|---|---|---|---|
| 2010/0089345 A1* | 4/2010 | Kim | F01M 13/022 |
| | | | 123/573 |
| 2012/0260885 A1 | 10/2012 | Linck | |
| 2013/0104357 A1* | 5/2013 | Zhmud | C23C 26/00 |
| | | | 29/90.01 |
| 2013/0125857 A1 | 5/2013 | Mayr et al. | |
| 2018/0086197 A1* | 3/2018 | Kim | B60K 11/02 |

FOREIGN PATENT DOCUMENTS

| | | |
|---|---|---|
| CN | 106837612 A | 6/2017 |
| DE | 39 23 530 A1 | 1/1990 |
| DE | 10 2010 025 980 A1 | 1/2012 |
| DE | 10 2013 016 504 A1 | 8/2014 |
| DE | 10 2014 204 509 A1 | 9/2015 |
| DE | 20 2016 004 440 U1 | 11/2017 |
| EP | 2 594 756 A1 | 5/2013 |
| JP | 6-159087 A | 6/1994 |
| JP | 2017-201138 A | 11/2017 |

OTHER PUBLICATIONS

German-language German Office Action issued in German application No. 10 2018 131 689.5 dated Jul. 9, 2019 (Six (6) pages).
Chinese Office Action issued in Chinese application No. 201980067910.2 dated Feb. 25, 2022, with English translation (Eighteen (18) pages).

* cited by examiner

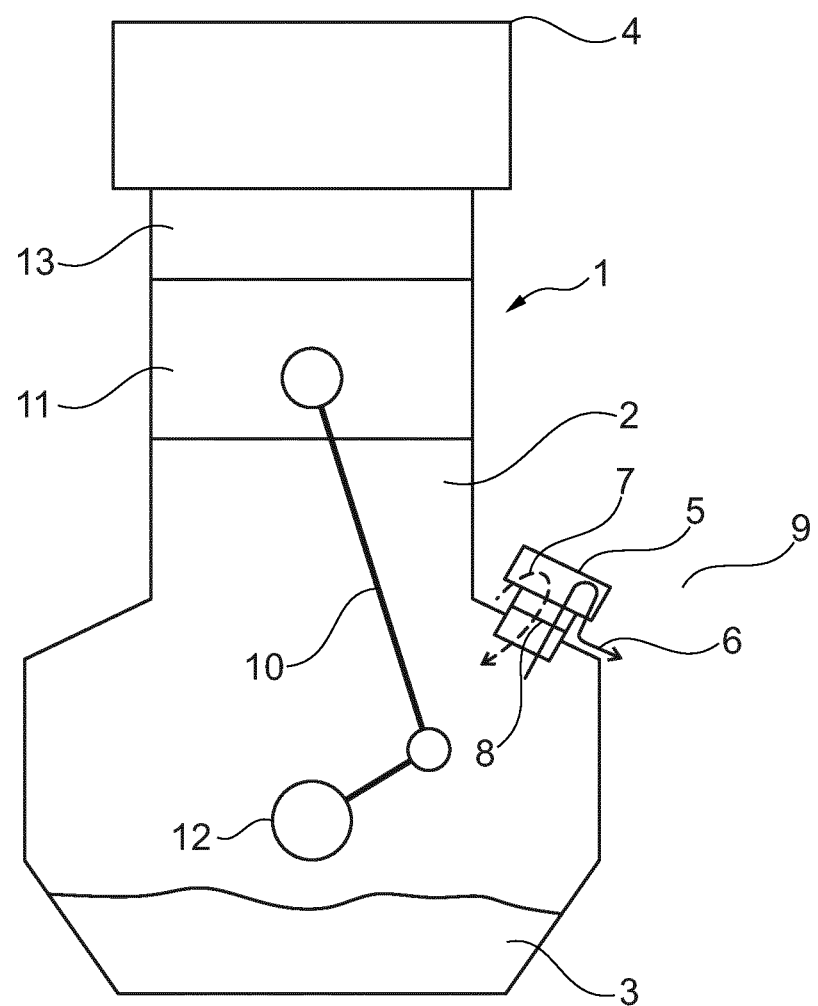

INTERNAL COMBUSTION ENGINE LUBRICATED WITH A WATER-CONTAINING LUBRICANT

BACKGROUND AND SUMMARY OF THE INVENTION

The invention relates to a liquid-lubricated internal combustion engine having a ventilation device. In general, an apparatus in a motor vehicle is known from DE 102010025980 A1.

The invention is described below in conjunction with an internal combustion engine and a water-containing lubricant for the lubrication of the internal combustion engine, and this description is not to be understood as a limitation of the invention. Water-containing lubricants offer advantages in relation to conventional lubricants, in particular with regard to efficiency and in particular also thermal behavior. The lubrication properties of such a water-containing lubricant are dependent inter alia on the water content in the lubricant. During the operation of a motor vehicle, in the device lubricated with the water-containing lubricant, that is to say in particular in the internal combustion engine or in individual sections of the internal combustion engine, temperatures can be reached which are such that the water changes into water vapor and escapes from the internal combustion engine, in the process, with the loss of the water, the water-containing lubricant loses its advantages in relation to classic engine oil. It is generally known to provide a metering device which feeds water to the water-containing lubricant and thus keeps the water fraction thereof constant.

It is the aim of the invention to specify an internal combustion engine which is supplied with a water-containing lubricant. In a preferred embodiment of the invention, the variability of the water content in the water-containing lubricant is improved in relation to a conventional internal combustion engine, that is to say the water fraction in the lubricant is kept approximately constant during the operation of the internal combustion engine.

In the context of the invention, an internal combustion engine is to be understood to mean a thermal engine for driving a motor vehicle, that is to say for providing drive power for overcoming driving resistances of the motor vehicle, and the internal combustion engine is preferably in the form of a reciprocating-piston internal combustion engine, which is preferably operable in accordance with the diesel or Otto-cycle principle. The internal combustion engine has an internal combustion engine interior, in which there are arranged at least one and preferably a multiplicity of components which are at least intermittently lubricated and cooled by means of a lubricant during the operation of the internal combustion engine. It is furthermore preferable that the water-containing lubricant is entirely or at least partially accommodated in the internal combustion engine interior.

Such a component is preferably to be understood as a piston, a bearing, a connecting rod or a shaft, in particular a crankshaft. The lubricant is furthermore accommodated in the internal combustion engine interior or is preferably introduced into the internal combustion engine interior for the purposes of lubricating the at least one component.

Furthermore, the lubricant is in the form of a water-containing lubricant and in the context of the invention a water-containing lubricant is to be understood to mean a lubricant which has at least 5 vol % water or more and the other components of which may be solid bodies, preferably so-called nanoparticles, or water-soluble substances. Water-containing lubricants per se are known from the prior art, these are in some cases also referred to as water-based lubricants. In particular, the operating properties of the internal combustion engine can be improved through the use of water-containing lubricants.

Furthermore, the internal combustion engine has a ventilation device for the purposes of pressure equalization, in particular with the environment surrounding the internal combustion engine, during the operation of the internal combustion engine, in other words in particular the internal combustion engine interior is fluidically connected or connectable to the environment by means of the ventilation device. Furthermore, the ventilation device has a semipermeable membrane.

In the context of the invention, a semipermeable membrane is to be understood to mean a membrane which is impermeable to water and/or water vapor in a first direction from a first surface toward a second surface and the membrane is furthermore preferably permeable to water and/or water vapor in a second direction from the second surface in the direction of the first surface. Such membranes or the functional operation thereof are also known in similar form from use in breathable sports clothing, under various trade names.

The semipermeable membrane faces with its first surface toward the internal combustion engine interior, such that an imaginary fluid flow from the internal combustion engine interior into the environment surrounding the internal combustion engine would have to flow through the membrane from the first to its second surface. This above-described flow direction is however specifically blocked by the installation situation of the semipermeable membrane, and an escape in particular of water vapor from the internal combustion engine interior into the environment is thus prevented or at least greatly restricted. It is furthermore preferable for the internal combustion engine to have a multiplicity of such ventilation devices. The internal combustion engine interior is preferably, with the exception of the at least one ventilation device, closed off in fluid-tight fashion with respect to the environment surrounding the ventilation device, such that an escape of water vapor from the internal combustion engine interior is prevented. In particular, by means of a membrane arranged in this way, the internal combustion engine interior is closed off in a manner impermeable to water and water vapor with respect to the environment surrounding the internal combustion engine such that no or only small quantities of moisture can escape from the internal combustion engine interior. Furthermore, with such a semipermeable membrane, it is thus made possible to at least reduce the escape of water or of water vapor from the internal combustion engine interior, and the water content in the water-containing lubricant can thus be kept constant or approximately constant.

In a preferred embodiment of the invention, a further membrane is provided in the ventilation device. Preferably, the further membrane is arranged downstream of the semipermeable membrane in relation to a flow direction from the apparatus interior into the environment surrounding the internal combustion engine. Preferably, the further membrane is in the form of a semipermeable membrane and is thus to be understood as a further semipermeable membrane.

More preferably, the further semipermeable membrane is arranged such that, in an imaginary flow direction from the environment surrounding the internal combustion engine into the internal combustion engine interior, the further semipermeable membrane closes off the internal combustion engine interior in a manner impermeable to water and water vapor. Figuratively speaking, the further semipermeable membrane is in such a case arranged in a mirror-inverted manner with respect to the semipermeable membrane. In particular, by means of such an arrangement, it is made possible to prevent or at least reduce the uncontrolled ingress of water and/or water vapor into the internal combustion engine interior.

In a preferred embodiment, the internal combustion engine is in the form of a reciprocating-piston internal combustion engine which is preferably operable in accordance with the two-stroke or preferably in accordance with the four-stroke principle, and furthermore, the internal combustion engine is included in a drivetrain of a motor vehicle, which is configured for providing drive powers for overcoming driving resistances (air resistance, friction resistance, gradient resistance etc.). In particular, the at least one component arranged in the internal combustion engine interior is in the form of a crankshaft which is connected by means of at least one connecting rod to at least one piston and, further preferably, the internal combustion engine interior is delimited at least in certain sections by means of a so-called engine oil pan, wherein the water-containing lubricant can preferably be at least intermittently and at least partially accommodated in the engine oil pan.

In a preferred embodiment, the internal combustion engine has a cooling circuit which is in particular provided for absorbing heat from the internal combustion engine and releasing the heat to the environment surrounding the internal combustion engine. The cooling circuit for the cooling of the internal combustion engine is preferably flowed through by the water-containing lubricant and, further preferably, at least one heat exchanger is arranged in this cooling circuit, which heat exchanger can be flowed through by the water-containing lubricant and further preferably, the internal combustion engine has no further cooling circuit in addition to the cooling circuit, it rather being the case that the cooling circuit that can be flowed through by water-containing lubricant replaces a conventional cooling circuit known from the prior art, in particular a so-called cooling water circuit of a conventional internal combustion engine which can be flowed through by a medium, in particular cooling water, which is additional to the water-containing lubricant. In particular, a simplification of the internal combustion engine can be achieved through a use of the water-containing lubricant in a cooling circuit, in particular, by means of such a simplification of the cooling circuit, the water-containing lubricant can be used directly for cooling the internal combustion engine.

In a preferred embodiment of the invention, the water-containing lubricant is additionally used for lubricating a so-called timing drive of the internal combustion engine. In this context, the timing drive is to be understood to mean a device of the internal combustion engine by means of which the gas exchange of the internal combustion engine can be controlled, in particular, the timing drive has at least one camshaft. In particular, through the use of a uniform lubricant for the internal combustion engine, it is possible to realize an internal combustion engine with a simple construction and high efficiency.

In a preferred embodiment, the internal combustion engine has a so-called crankshaft starter generator. A crankshaft starter generator is to be understood to mean an electromechanical energy converter, in particular an electric motor/generator, which is couplable or preferably coupled to the crankshaft of the internal combustion engine and which is configured at least for the crank starting of the internal combustion engine from a standstill. Preferably, the crankshaft starter generator is arranged concentrically with respect to the crankshaft of the internal combustion engine or preferably connectable or preferably connected thereto by means of a transmission device and, further preferably, the crankshaft starter generator is arranged axially parallel with respect to the crankshaft. Further preferably, the crankshaft starter generator can be supplied with a liquid medium, in particular, the crankshaft starter generator can be lubricated and/or cooled by means of the medium. Preferably, this water-containing lubricant is used for this supply to the crankshaft starter generator and, further preferably, the crankshaft starter generator and the internal combustion engine thus have a common lubricant management arrangement. In this context, a common lubricant management arrangement is to be understood to mean that at least the internal combustion engine and the crankshaft starter generator are supplied with the same water-containing lubricant, that is to say in particular with a single or common water-containing lubricant. In particular, by means of such a configuration, a particularly simple construction of the internal combustion engine with starter generator is made possible, because this has only one lubricant management arrangement with one common lubricant.

Further preferably, at least one component that can be supplied with the water-containing lubricant, in particular a component of the internal combustion engine and/or of the crankshaft starter generator, has a friction-reducing coating, preferably a "diamond-like carbon" (DLC) coating or the like, at least in certain sections. Preferably, at least two components which make direct contact with one another, preferably a piston and a piston bearing surface, have such a coating for reducing friction. In particular, by means of such a coating of at least one of these components, so-called "superlubricity" can be achieved. Here, superlubricity is to be understood to mean a situation in which friction can almost completely vanish. Preferably, at least one component of the timing drive has such a coating and, particularly preferably, at least one camshaft has such a coating at least in certain sections or preferably in its entirety. In particular, through the use of such a coating, particularly low-friction operation of the internal combustion engine is made possible.

In a preferred embodiment, the internal combustion engine has a water injection means. In particular, a water injection means is to be understood to mean a device by means of which water can be fed in targeted fashion to at least one combustion chamber of the internal combustion engine. A water injection means per se is known from the prior art. Further preferably, the water injection means has a metering device by means of which water can be fed to the water-containing lubricant. Further preferably, the metering device is provided for keeping the fraction of water in the water-containing lubricant in a predefinable range and thus promoting efficient operation of the internal combustion engine. In particular by means of the water introduced into the at least one combustion chamber of the internal combustion engine by the water injection means, the emissions of the internal combustion engine can be positively influenced and, furthermore, there is a resulting positive interaction between the water injection means and the water-containing lubricant of the internal combustion engine.

Individual features of the invention will be discussed in more detail below on the basis of a FIGURE.

BRIEF DESCRIPTION OF THE DRAWING

FIG. 1 is a schematic cross section through an internal combustion engine with water-containing lubricant and ventilation means.

DETAILED DESCRIPTION OF THE DRAWING

FIG. 1 illustrates a schematic cross section through an internal combustion engine 1. In the internal combustion engine 1, the crankshaft 12 and connecting rod 10 and piston 11, and corresponding bearings and bearing points, are arranged as components to be lubricated. For the lubrication of these components, the water-containing lubricant 3 is accommodated in the internal combustion engine interior 2. For ventilation, the internal combustion engine 1 has a ventilation means 5 (ventilation device) with a semipermeable membrane 8. For the control of the gas exchange, the internal combustion engine 1 has the cylinder head 4. Arranged in the cylinder head 4 is the camshaft, which can be driven by the timing drive (not illustrated) and by means of which the gas exchange in the internal combustion engine 1 can be controlled by way of so-called inlet and outlet valves.

Here, the semipermeable membrane 8 is arranged so as to be impermeable to water and/or water vapor in a flow direction 6 from the internal combustion engine interior 2 into the environment 9 surrounding the internal combustion engine 1. Furthermore, the semipermeable membrane 8 is permeable to water and/or water vapor with respect to a flow direction 7 from the environment 9 surrounding the internal combustion engine 1 into the internal combustion engine interior 2.

By means of such a configuration of the internal combustion engine 1, it is made possible that no or only small quantities of moisture (water/water vapor) can escape from the internal combustion engine 1 and the water content in the water-containing lubricant 3 in the internal combustion engine interior 2 is thus, in particular during the operation thereof, kept at least substantially constant.

In other words, the invention provides the use of a water-containing lubricant for lubrication and/or cooling in an internal combustion engine. Through this use, a lowering of viscosity in relation to conventional lubricating oils, that is to say in particular non-water-containing lubricants, is made possible and a reduction in the power losses/drag losses can be achieved in this way;

a reduction in the lubricating oil volume can be achieved through improved calorific properties of the water-containing lubricant in relation to conventional lubricating oil (heat transfer, heat capacity);

synergistic effects with the cooling water circuit (cooling power, potential for use of only one medium) are made possible, and thus a simplification/a replacement of the so-called cooling water circuit can be achieved;

and, through the use of coated friction partners/components (inter alia DLC on piston and cylinder), a friction reduction can be achieved and, in particular with the use of coated friction partners, there is resulting potential for generation of superlubricity.

LIST OF REFERENCE CHARACTERS

1 Internal combustion engine
2 Internal combustion engine interior
3 Water-containing lubricant
4 Cylinder head
5 Ventilation means
6 Flow direction out of the internal combustion engine
7 Flow direction into the internal combustion engine
8 Semipermeable membrane
9 Environment
10 Connecting rod with bearings
11 Piston
12 Crankshaft with bearings
13 Combustion chamber

What is claimed is:

1. An internal combustion engine, comprising:
    an internal combustion engine interior;
    a lubricant, wherein the lubricant is disposed in the internal combustion engine interior, wherein the lubricant lubricates a component disposed in the internal combustion engine interior, and wherein the lubricant is a water-containing lubricant; and
    a ventilation device, wherein the internal combustion engine interior is fluidically connected to an environment surrounding the internal combustion engine by the ventilation device;
    wherein the ventilation device has a first semipermeable membrane which is impermeable to water and water vapor in a first direction from a first surface of the first semipermeable membrane toward a second surface of the first semipermeable membrane and wherein the first surface of the first semipermeable membrane faces toward the internal combustion engine interior.

2. The internal combustion engine according to claim 1 further comprising a water injection device, wherein water is introducible into a combustion chamber of the internal combustion engine by the water injection device.

3. The internal combustion engine according to claim 2, wherein water is feedable from the water injection device to the water-containing lubricant.

4. The internal combustion engine according to claim 1, wherein the ventilation device has a second semipermeable membrane, wherein the second semipermeable membrane is disposed downstream of the first semipermeable membrane in relation to a first flow direction from the internal combustion engine interior to the environment surrounding the internal combustion engine, and wherein the second semipermeable membrane is impermeable to water and water vapor in a second flow direction from the environment surrounding the internal combustion engine to the internal combustion engine interior.

5. The internal combustion engine according to claim 1, wherein the internal combustion engine is a reciprocating-piston internal combustion engine and wherein the component disposed in the internal combustion engine interior is a crankshaft.

6. The internal combustion engine according to claim 1 further comprising a timing drive with a camshaft, wherein the camshaft has a friction-reducing coating at least in a section.

7. The internal combustion engine according to claim 1 in combination with a crankshaft starter generator, wherein the crankshaft starter generator and the internal combustion engine are supplied with the water-containing lubricant.

* * * * *